United States Patent [19]
Kopka

[11] Patent Number: 5,264,908
[45] Date of Patent: Nov. 23, 1993

[54] OPTICAL DEVICE FOR MEASURING THE SPEED OR LENGTH OF A MOVED SURFACE

[75] Inventor: Michael Kopka, Dortmund, Fed. Rep. of Germany

[73] Assignee: Mesacon Gesellschaft fur MeBtechnik mbH, Fed. Rep. of Germany

[21] Appl. No.: 859,374
[22] PCT Filed: Sep. 27, 1991
[86] PCT No.: PCT/EP91/01855
§ 371 Date: Jul. 24, 1992
§ 102(e) Date: Jul. 24, 1992
[87] PCT Pub. No.: WO92/06389
PCT Pub. Date: Apr. 16, 1992

[30] Foreign Application Priority Data
Sep. 27, 1990 [DE] Fed. Rep. of Germany ....... 9013559

[51] Int. Cl.$^5$ .................................................. G01P 3/36
[52] U.S. Cl. ....................................... 356/28.5; 356/28
[58] Field of Search ............................... 356/28.5, 28

[56] References Cited
U.S. PATENT DOCUMENTS

| | | | |
|---|---|---|---|
| 3,738,750 | 6/1973 | Kalb et al. | 356/28 |
| 3,982,101 | 9/1976 | Kalb et al. | 73/194 E |
| 4,912,519 | 4/1990 | Yoshida et al. | 356/28 |
| 4,925,297 | 5/1990 | Brown | 356/28.5 |

FOREIGN PATENT DOCUMENTS
3111356 3/1982 Fed. Rep. of Germany .
311068 8/1982 Fed. Rep. of Germany .
3219533 12/1983 Fed. Rep. of Germany .

Primary Examiner—Mark Hellner
Attorney, Agent, or Firm—Banner, Birch, McKie & Beckett

[57] ABSTRACT

The invention relates to a device for measuring the speed or length of a moved surface, where a measuring light beam from a laser is used. The laser light beam reflected from the surface to be measured is frequency-shifted by the Doppler effect so that the overlaying of the outgoing light beam and the incoming one results in a beat which is a measure of the speed of the surface. Before the speed can be determined, digital signals occurring in large numbers must be processed in an evaluation system. The evaluation system is characterized in that there is downstream of a counter intended for detecting the incoming signals and having a high counting speed an intermediate store which is connected to an adding mechanism for pulse-wise monitoring of the counter contents. A control mechanism handles coordination of the counter, the intermediate store and the adding mechanism, upstream of which is a pulse generator. Counting results are added in the adding mechanism and occur at a substantially lower speed than the individual measuring signals.

2 Claims, 1 Drawing Sheet

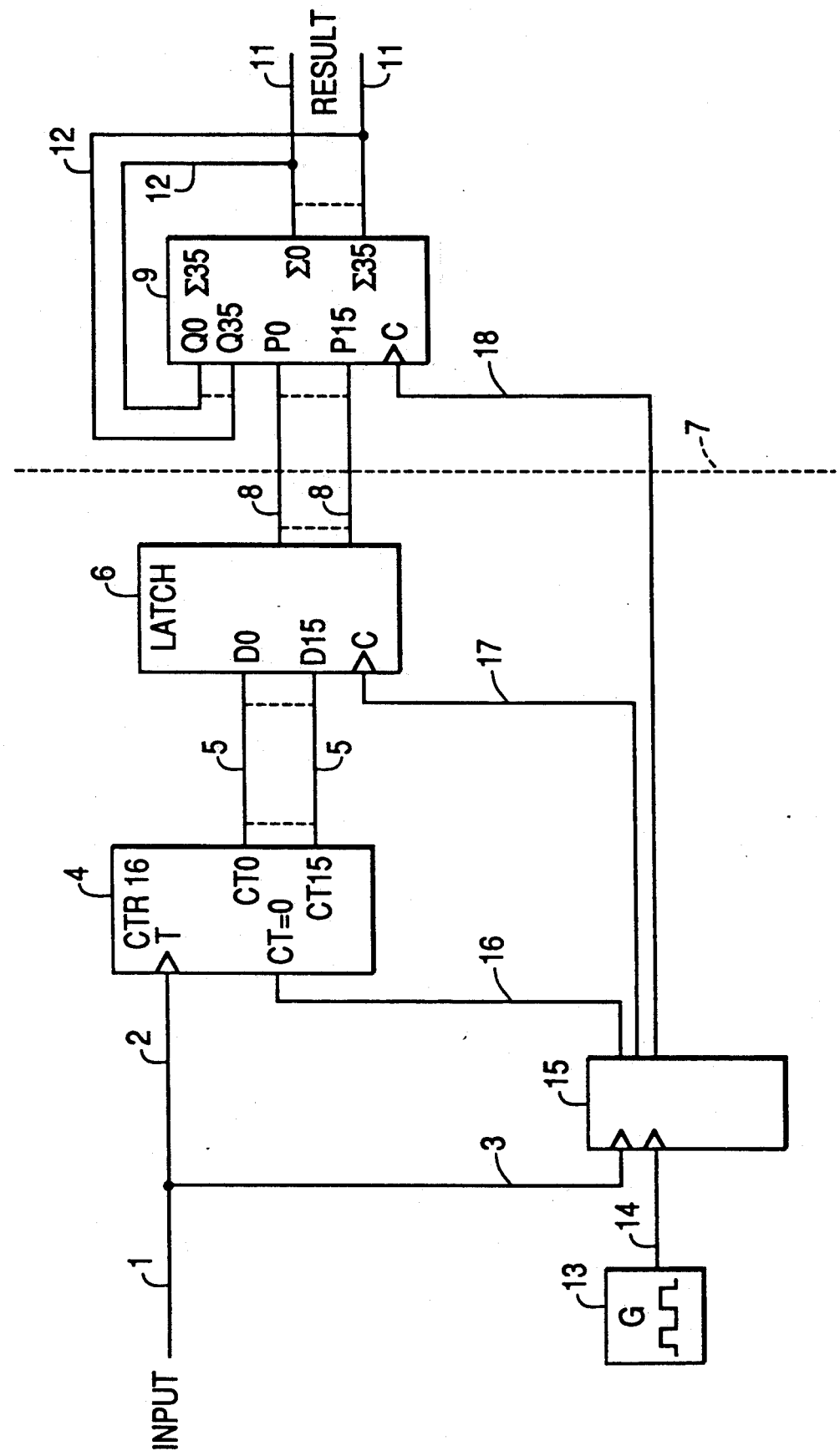

OPTICAL DEVICE FOR MEASURING THE SPEED OR LENGTH OF A MOVED SURFACE

The invention relates to an optical device for measuring the speed or length of a moved surface, where a measuring light beam from a laser is directed towards the surface and the Doppler-shifted dispersed light reflected from the surface and other light, for example laser light which is not Doppler-shifted or another Doppler-shifted laser light, are overlaid to produce a beat whereof the frequency forms a measure of the speed of the surface and is received and evaluated in an evaluation system in the form of continuously occurring digital signals.

In the development of the evaluation system, the fact that the length information obtained by the measuring process is based on a quantization in the order of magnitude of 10 μm must be taken into account. Because of the speed of the material measured, which may be high, and the frequency offset used, the measured frequencies may be up to 10 MHz. For the measuring process to be accurate, it is necessary for the evaluation system to detect and evaluate all the length increments.

When using the hitherto conventional analog evaluation systems having so-called tracking filters, false measurements are often produced, particularly if the useful signal cannot be clearly separated in the evaluation system from the noise components.

In a further known evaluation system, the measured frequencies are measured in a measuring cycle and evaluated by integration in a subsequent evaluation cycle. It is true that here only an individual rapid counter of low counting capacity and a downstream adding mechanism of low speed are used so that the expenditure for equipment remains on an acceptable scale; however, with this solution it is not possible to count and add at the same time, so that individual length increments are not detected, so that falsifications in the result are caused by the alternating measuring and evaluation cycles.

With a maximum length of measured material of 100 km, evaluation may also be performed by a synchronous 35-bit incremental/decremental counter having a maximum counting frequency of 10 MHz. However, this solution would necessitate a considerable expenditure for hardware.

It is thus the object to provide an evaluation system by means of which the signals, namely the measured frequencies, are received and evaluated continuously without loss of information, without a disproportionately high expenditure being necessary for this.

In accordance with the invention, this object is achieved in that, in an optical device of the type mentioned at the outset, there is downstream of a counter intended for detecting the signals and having a high counting speed an intermediate store which is connected to an adding mechanism for pulse-wise transmission of the counter contents, in that a control mechanism for sequence control is connected to the counter, the intermediate store and the adding mechanism, and in that a pulse generator is upstream of the control mechanism.

The main advantage of this evaluation system according to the invention consists in the fact that it receives and processes the signals occurring continuously from the optical system, that is to say the measured frequency values, continuously, so that thus all the length increments are measured continuously at any speed of measured material and a correspondingly high accuracy of measurement results.

For the simultaneous rapid counting of the signals, a correspondingly rapid counter is provided which can, however, have a low counting capacity and thus requires only a low expenditure by comparison with the prior art.

The signals which have been counted by the counter within a predetermined sampling time ar transferred, once the sampling time has expired, to the store, which passes the signals on to the adding mechanism, where they are added, or subtracted as appropriate, to the previous result. The essential point is that there is available for this transfer and addition a period of time which corresponds at most to the sampling time, that is to say the pulse time. This time is sufficient for this function to be carried out by a program-controlled microprocessor. The sequence control, namely the coordination of the counter, the intermediate store and the adding mechanism, is handled by the control mechanism, to which a sampling time for the control of the above-mentioned components is predetermined by the upstream pulse generator.

This construction allows available integrated counter modules to be used and the adding procedure to be carried out in a microprocessor system. Here, counting mechanisms of virtually any size in relatively slow circuit portions, such as a microprocessor, can be used. Incidently, fluctuations in the sampling time do not influence the accuracy of measurement, since no length increments are lost.

In accordance with a further development according to the invention, it is provided for the inlet of the evaluation system to be coupled to the control mechanism such that the pulse is synchronized to the inlet frequency. This prevents metastable states with the inlet frequency. The synchronization of the pulse and inlet frequency is restricted to matching of the signal edges.

The invention is explained in more detail below with reference to an example embodiment.

The drawing diagrammatically illustrates a circuit of a portion of the evaluation system which handles counting and adding of the signals emitted continuously by the optical system.

At the inlet of the evaluation system, at which the incoming signals $F_{in}$, namely the measured frequencies, are accepted, an inlet line 1 branches into a line 2 and a line 3. The line 2 leads to the inlet side of a counter 4 which operates rapidly but with a low counting capacity, in the present embodiment a 16-bit counter. At the outlet side, the counting stages CT0 to CT15 are connected by way of lines 5 to store stages D0 to D15 at the inlet of an intermediate store 6. The outlets of the intermediate store 6 are connected by way of lines 8 to the inlet stages P0 to P15 of an adding mechanism 9. The separation line at 7 is intended to indicate that the circuit portion to the left of this line can be in the form of an integrated circuit and the portion to the right of this line can be in the form of a program-controlled microprocessor. At the outlet of the adding mechanism, the measured values leave this portion of the evaluation system as a continuously incremented item of length data to a maximum of $2^{36} \times 10$ μm. The lines 12, which lead back from the outlet side of the adding mechanism to a second inlet thereof, are a symbol of the continuous addition of the signals accepted from the intermediate store 6 to the addition results present.

Arranged in the left-hand portion of the circuit as a pulse generator 13 is a generator which produces the operating pulse, namely a sampling time of, in the present case, 100 μs, for the sequence control. The pulse frequency generated by the pulse generator 13 of, in the present case, 10 kHz, is passed by way of a line 14 to a control mechanism 15 which handles the sequence control and for this purpose is connected by way of a line 16 to the counter 4, by way of a line 17 to the intermediate store 6 and by way of a line 18 to the counting mechanism 9.

From the inlet of the circuit, the branch line 2 leads to the control mechanism 15, so that the inlet signal $F_{in}$ can be synchronized to the frequency of the pulse generator 13 in the control mechanism 15.

When the optical device is in operation, the inlet signals $F_{in}$ received continuously by the circuit by way of the inlet on the lines 1 and 2, representing the measured frequencies and lying within the range of 10 kHz to 10 MHz, are counted continuously in the counter 4. After a sampling time predetermined by the pulse generator 13 has expired, the counter state is transferred, with a delay of $1/(2F_{in})$, to the intermediate store 6 and at the same time the counter four is set to zero. However, the counter 4 can also be reset at another point in time, but must be in good time for the remaining counting capacity to be sufficient for a sampling time.

Then, the stored value is transferred from the intermediate store 6 by way of the lines 8 to the adding mechanism 9 and is added there, or subtracted as appropriate, to the old result. For transfer and addition a period of time of at most the sampling time, which is here 100 μs, is available. This time is sufficient for the functioning of the adding mechanism 9 in the form of a program-controlled microprocessor. Triggering is effected by an external program interrupt.

The total count of all the length increments which have occurred up to that point is thus available within the pulse of the sampling time of 100 μs at the outlet of the evaluation system, by way of the lines 11. In conclusion, it is stressed once again that by means of this evaluation system, which is to be understood merely as an example embodiment, all the inlet signals $F_{in}$ are continuously received and evaluated without interruption. In relation to the continuous evaluation without loss of work, the expenditure for the device is relatively low.

I claim:

1. A device for measuring the speed or length of a moved surface using a light beam from a laser directed towards the surface, receiving a Doppler-shifted dispersed light reflected from the surface and producing a beat signal in the form of a continuously occurring digital signal, wherein the frequency of the beat signal forms a measure of the speed of the surface, the device comprising:

a counter for counting the beat signal;

an intermediate store, coupled to an output of the counter, for receiving a count of the beat signal;

an adding circuit, coupled to an output of the intermediate store, for adding the count of the beat signal to a first result;

a pulse generator for generating an operating pulse; and a control mechanism, responsive to the operating pulse, for controlling a sequence of the counter counting the beat signal, the intermediate store receiving the count and the adding circuit for adding the count to the first result.

2. A device according to claim 1, wherein the beat signal is coupled to the control mechanism and wherein the control mechanism synchronizes the beat signal and the operating pulse.

* * * * *